(12) United States Patent
Tsai

(10) Patent No.: US 6,431,567 B2
(45) Date of Patent: Aug. 13, 2002

(54) COLLAPSIBLE SKATEBOARD

(76) Inventor: Shui-Te Tsai, P.O. Box 82-144, Taipei (TW)

( * ) Notice: Subject to any disclaimer, the term of this patent is extended or adjusted under 35 U.S.C. 154(b) by 0 days.

(21) Appl. No.: 09/816,311

(22) Filed: Mar. 26, 2001

Related U.S. Application Data

(63) Continuation of application No. 09/222,840, filed on Dec. 30, 1998, now Pat. No. 6,206,387.

(51) Int. Cl.⁷ ................................................. B62M 1/00
(52) U.S. Cl. ................................ 280/87.041; 280/14.3; 280/278; 16/359; 403/92
(58) Field of Search ........................... 280/14.3, 87.021, 280/87.041, 87.042, 87.05, 278, 287; 16/322, 326, 348, 349, 358, 359; 403/91, 92, 93, 94, 96; 246/188.6

(56) References Cited

U.S. PATENT DOCUMENTS

| 1,297,282 | A | 3/1919 | White |
| 1,391,312 | A | 9/1921 | Gebhardt |
| 1,658,068 | A | 2/1928 | White |
| 1,687,953 | A | 10/1928 | Starks |
| 1,968,975 | A | 8/1934 | Upsacker et al. |
| 2,546,711 | A | 3/1951 | Amendt |
| 3,396,928 | A | 8/1968 | Lay |
| 4,707,884 | A | 11/1987 | Chang |
| 4,735,392 | A | 4/1988 | Farmer |
| 4,905,946 | A | 3/1990 | Wang |
| 5,102,079 | A | 4/1992 | Lee |
| 5,183,129 | A | 2/1993 | Powell |
| 5,437,425 | A | 8/1995 | Hou |
| 5,816,614 | A | * 10/1998 | Kramer, Jr. et al. .......... 403/93 |
| 5,927,733 | A | 7/1999 | Banda |
| 5,938,223 | A | * 8/1999 | Kotlier |
| 6,120,044 | A | * 9/2000 | Tsai ....................... 280/87.041 |
| 6,182,988 | B1 | * 2/2001 | Wu ....................... 280/87.041 |
| 6,206,387 | B1 | * 3/2001 | Tsai ....................... 280/87.041 |

* cited by examiner

Primary Examiner—Brian L. Johnson
Assistant Examiner—Christopher Bottorff
(74) Attorney, Agent, or Firm—Browdy and Neimark, P.L.L.C.

(57) ABSTRACT

A collapsible skateboard includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector, whereby the skateboard can be easily folded up as desired.

12 Claims, 6 Drawing Sheets

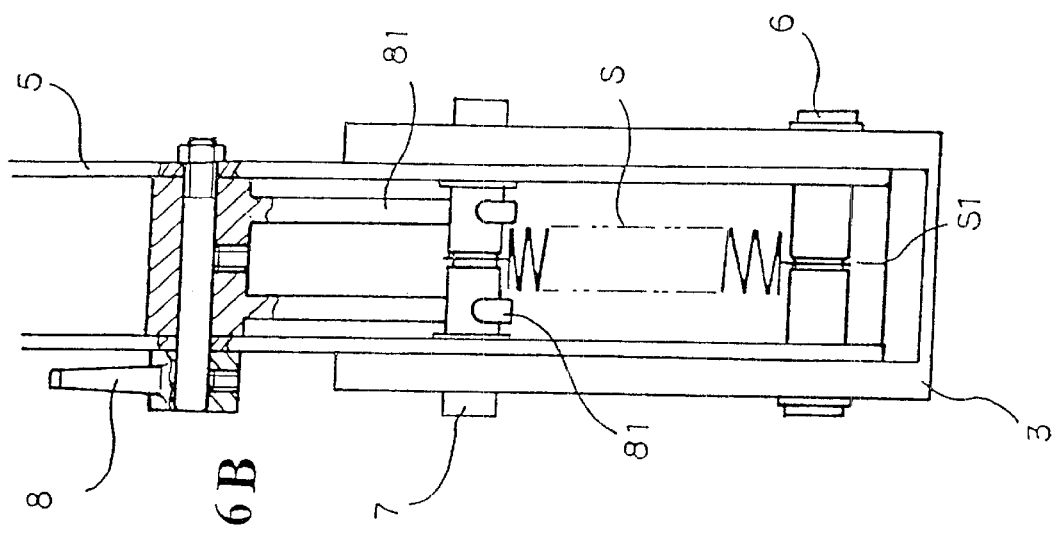
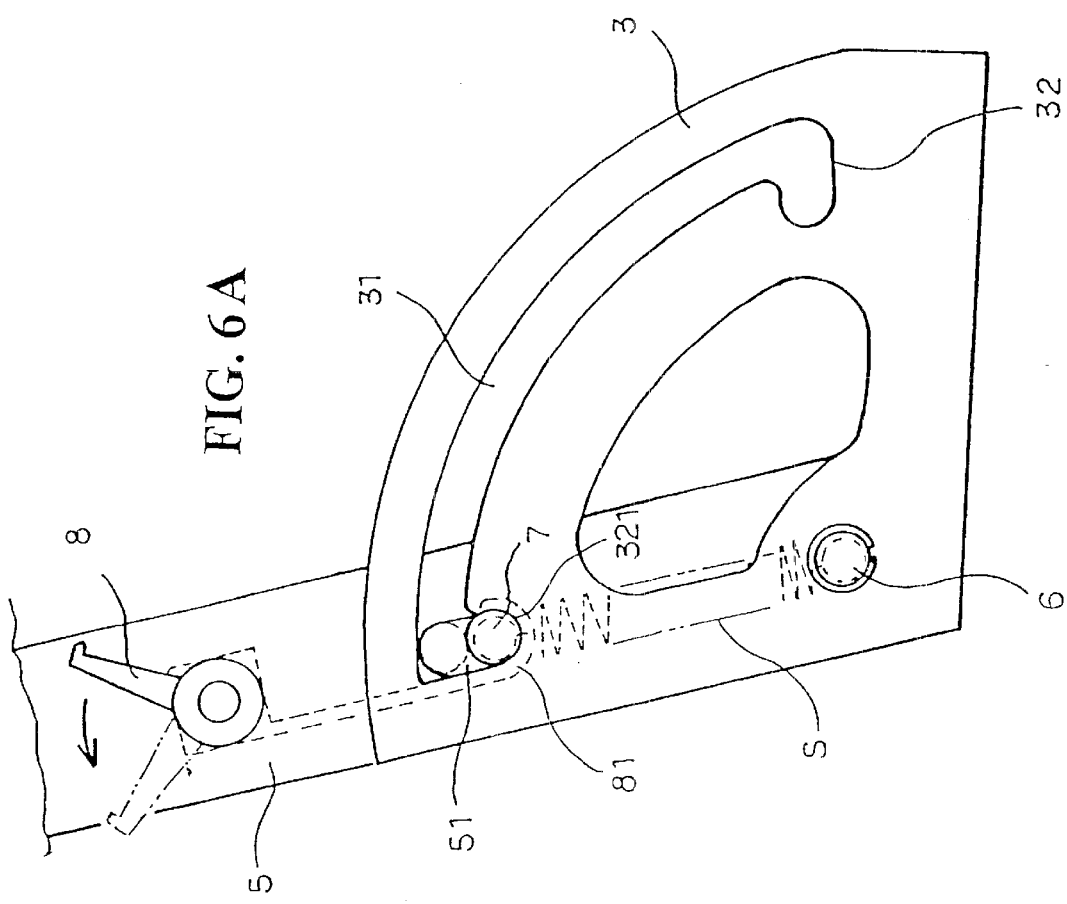

COLLAPSIBLE SKATEBOARD

This is a continuation of parent application Ser. No. 09/222,840, filed Dec. 30, 1998 now U.S. Pat. No. 6,206,387.

BACKGROUND OF THE INVENTION

1. Field of the Invention

This invention is related to an improvement in the structure of a collapsible skateboard.

2. Description of the Prior Art

The conventional skateboard with an upright handle is fixed in structure so that it is difficult to carry. Hence, a collapsible skateboard has been developed to obviate this drawback. However, such a collapsible skateboard is complicated in structure and expensive in cost. Furthermore, the handle of the collapsible skateboard cannot be kept at a fixed position, thereby making it inconvenient to use.

Therefore, it is an object of the present invention to provide an improved collapsible skateboard which can obviate and mitigate the above-mentioned drawbacks.

SUMMARY OF THE INVENTION

This invention is related to an improvement in the structure of a collapsible skateboard.

It is the primary object of the present invention to provide a collapsible skateboard which includes an upright handle having lower portion on which is fixedly mounted a bracket, a connector having a curved slot having a lower end formed with a horizontal recess, an upper end formed with a vertical recess, and a circular hole under the vertical recess, an adjust pin inserted into the vertical recess of the connector and the elongated hole of the bracket, a pivot pin fitted through the circular hole of the connector and the circular hole of the bracket, a spring having an upper end connected to the adjust pin and a lower end to the pivot pin, and a platform on which is fixedly mounted the connector.

It is another object of the present invention to provide a collapsible skateboard wherein the connection is a U-shaped member having two upwardly extending lugs each formed with the curved slot.

It is still another object of the present invention to provide a collapsible skateboard further comprising a control mechanism which includes a cylindrical member pivotally mounted on the bracket and having an end extending out of the bracket to fixedly connect with a lever and a hook extending downwardly within the bracket to engage with the adjust pin.

It is still another object of the present invention to provide a collapsible skateboard which can be easily folded as desired.

It is a further object of the present invention to provide a collapsible skateboard which is simple in construction.

BRIEF DESCRIPTION OF THE DRAWINGS

FIGS. 6A and 6B illustrate another preferred embodiment of the present invention.

DETAILED DESCRIPTION OF THE PREFERRED EMBODIMENT

Figure 1:
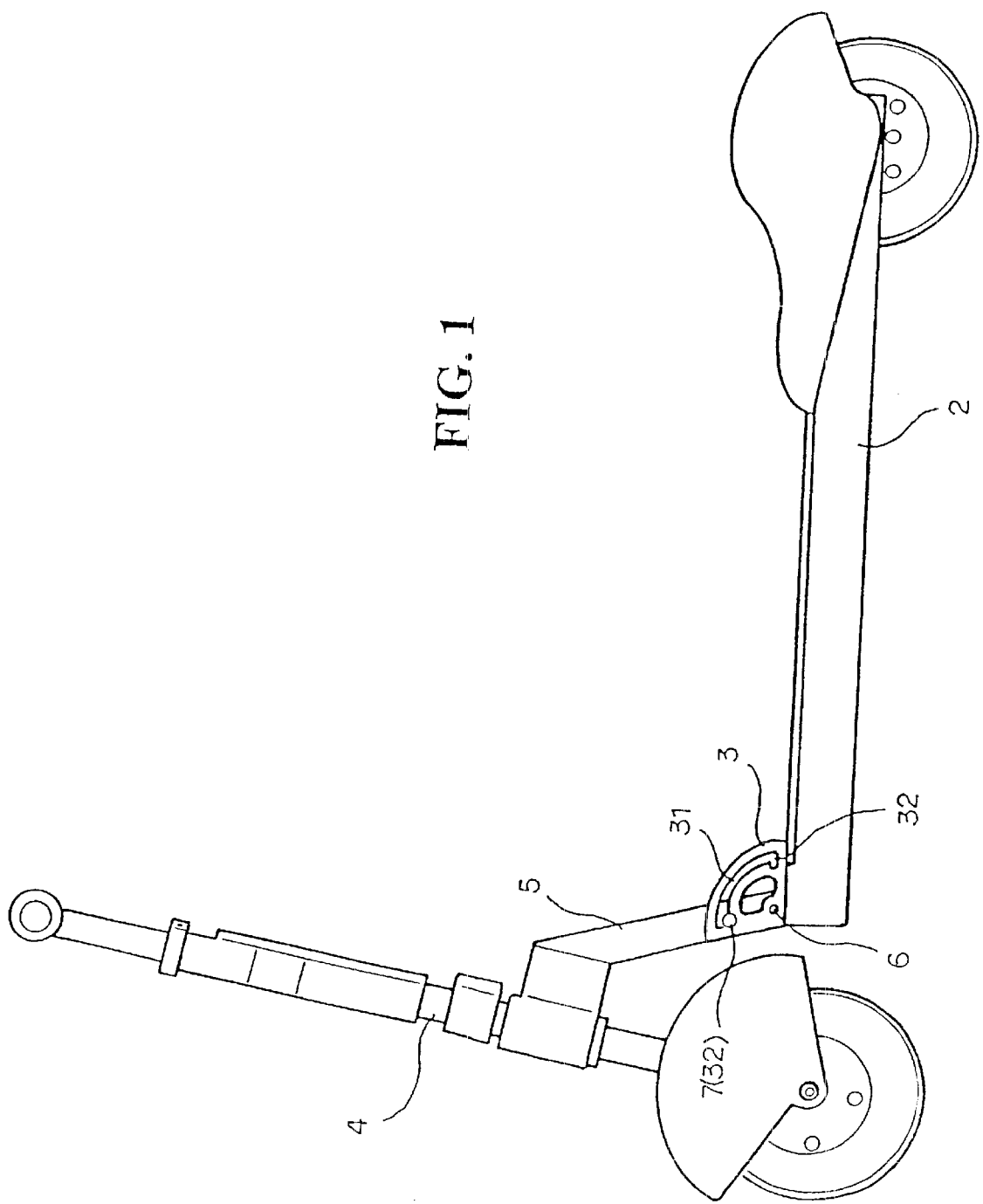
FIG. 1 is a side view of the present invention.
Figure 2:
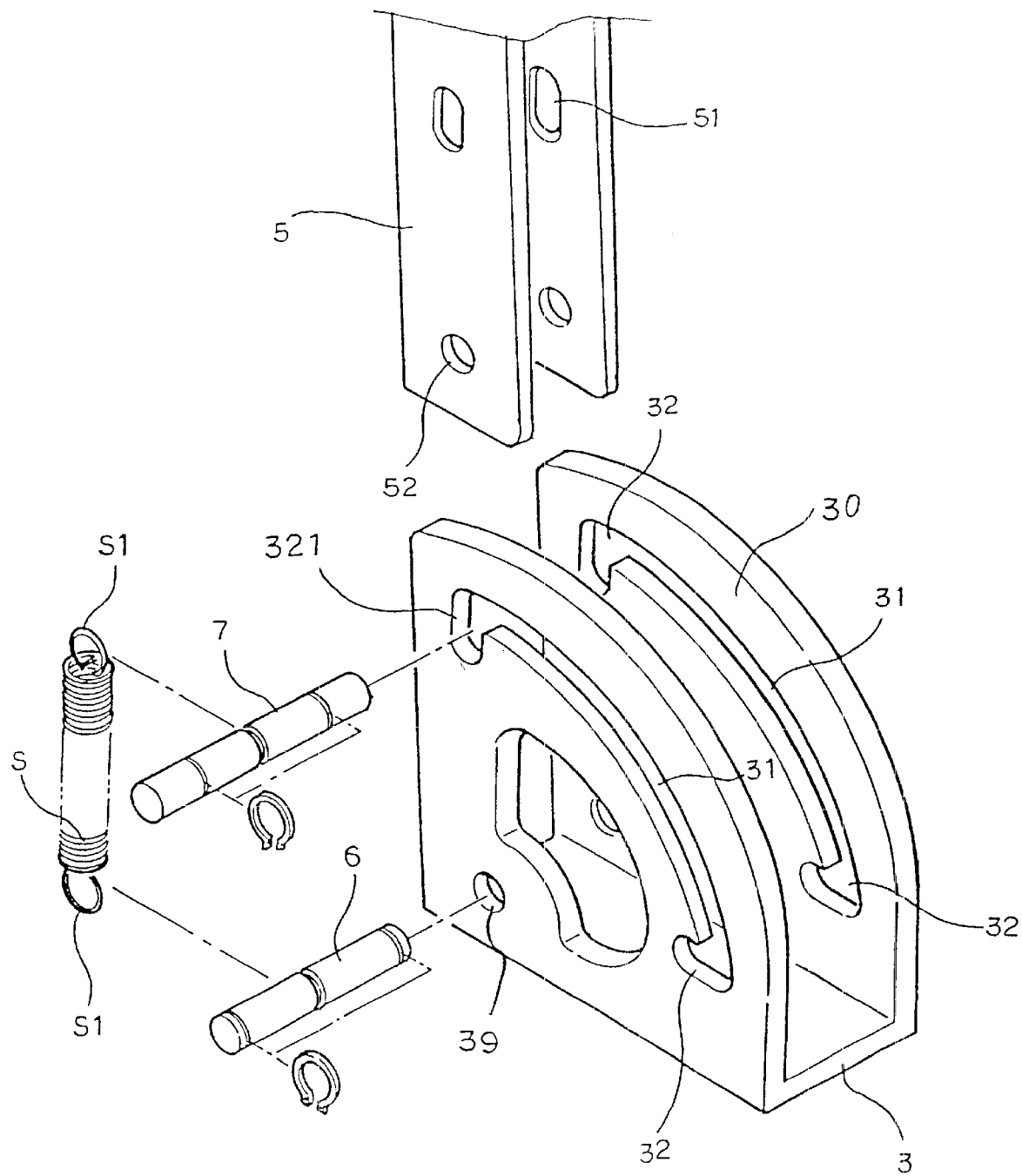
FIG. 2 is an exploded view of the present invention.
Figure 3:
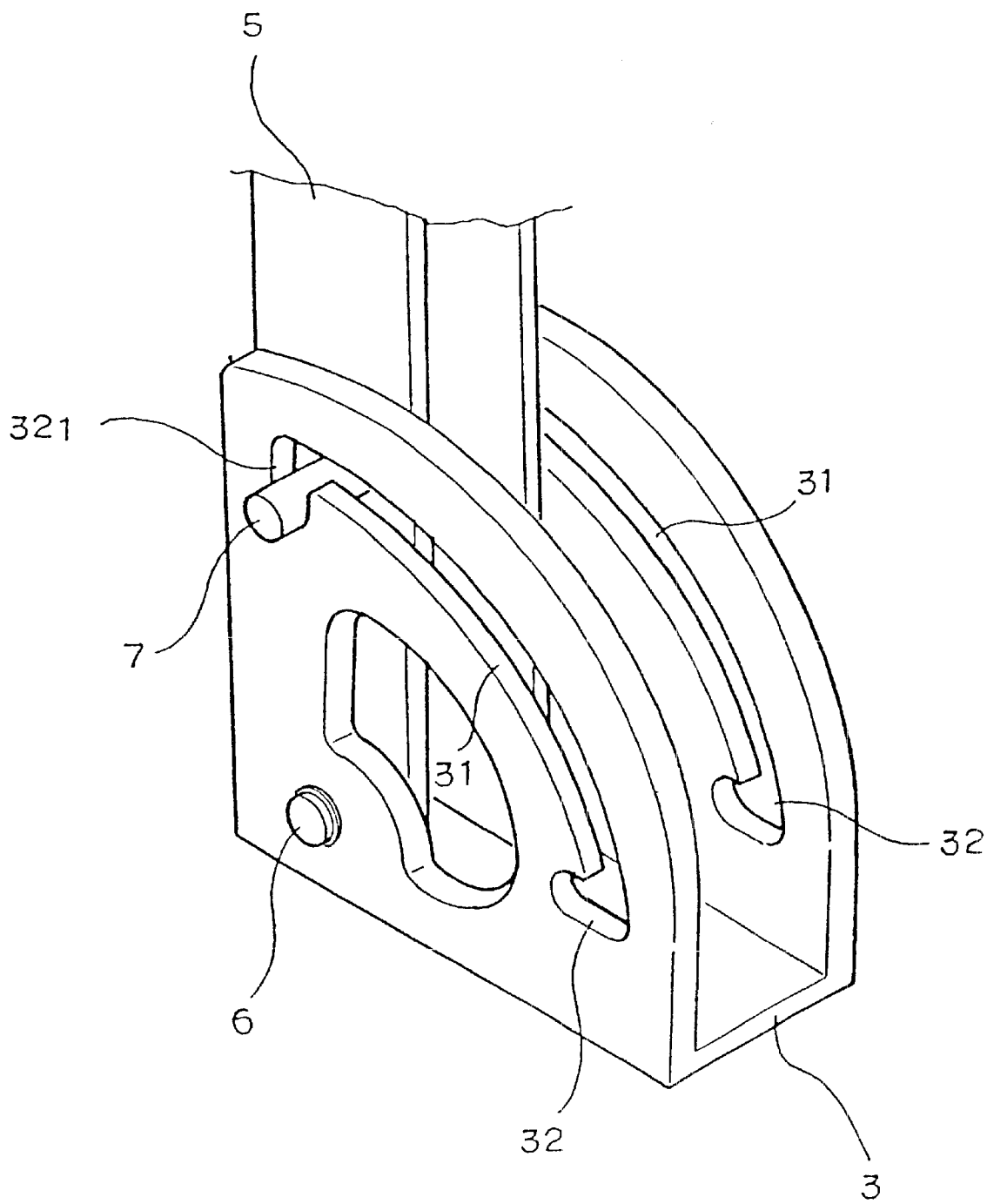
FIG. 3 is a perspective view of the present invention.
Figure 4:
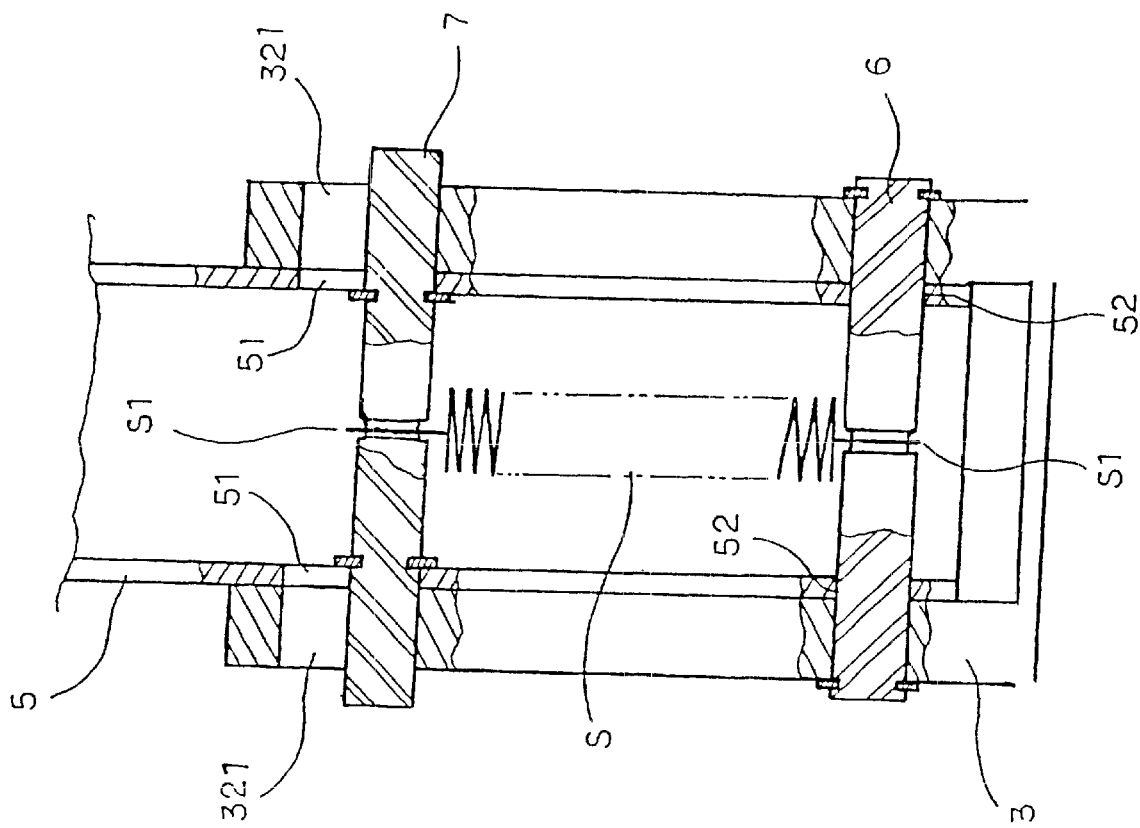
FIG. 4 is a sectional view of the present invention.

Referring to FIGS. 1, 2 and 3, the collapsible skateboard according to the present invention generally comprises an upright handle 4, a bracket 5, a connector 3 and a platform 2. The bracket 5 is fixedly mounted on the handle 4 and provided with two legs 5 extending downwardly toward the platform 2. Each leg 5 has an elongated hole 51 and a circular hole 52 below the elongated hole 51. The connector 3 is formed with two upwardly extending lugs 30 configured to receive the two legs 5 therein. Each of the lugs 30 has a curved slot 31 formed with a horizontal recess 32 at the lower end and a vertical recess 321 at the upper end. Each lug 30 is further formed with a circular hole 39 below the vertical recess 321. An adjust sin 7 is inserted into the vertical recesses 321 of the connector 3 and the elongated holes 51 of the bracket 5. A pivot pin 6 is fitted through the circular holes 39 of the connector 30 and the circular holes 52 of the bracket 5 so that the handle 4 together with the bracket 5 can be folded on the platform 2. A spring S has an upper end S1 connected to the intermediate portion of the adjust pin 7 and a lower end connected to the intermediate portion of the pivot pin 6 so that the adjust pin 7 will be retained within the vertical recess 5 321 thereby keeping the handle 4 at an upright position.

Figure 5:
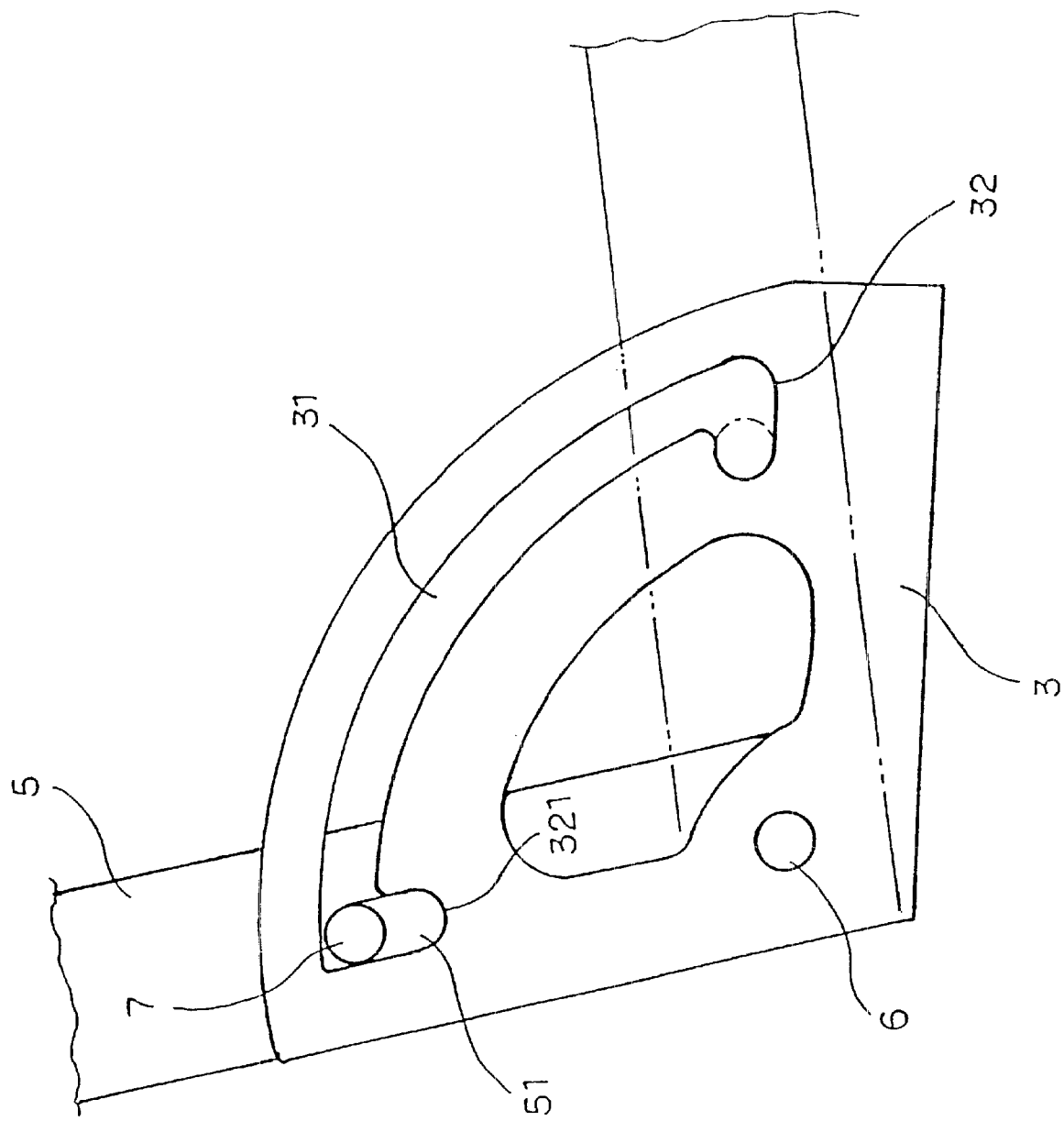
FIG. 5 illustrates the working principle of the present invention.

When desired to fold the skateboard, it is only necessary to move the adjust pin 7 upwardly out of the vertical recesses 321 and then move the handle 4 together with the bracket 5 toward the platform 2 so that the adjust pin 7 is moved along the curved slots 31 to engage with the horizontal recesses 32 (see FIG. 5). When in use, simply move the handle 4 along the direction away from the platform 2 so that the adjust pin 7 is moved along the curved slots 31 to engage with the vertical recesses 321.

FIGS. 6A and 6B illustrate another preferred embodiment of the present invention. As shown, a control mechanism 8 is pivotally mounted on the bracket 5 and arranged above the adjust pin 7. The control mechanism 8 includes a cylindrical member pivotally mounted on the bracket 5 and having an end extending out of the bracket 5 to fixedly connect with a lever 8 and a hook 81 extending downwardly within the bracket 5 to engage with the adjust pin 7, so that the adjust pin 7 can be moved upwardly out 5 of the vertical recesses 321 by turning the lever 8 thereby enabling the handle 4 to fold on the platform 2 as desired.

Other objects of the invention will in part be obvious and in part hereinafter pointed out.

The invention accordingly consists of features of constructions and method, combination of elements, arrangement of parts and steps of the method which will be exemplified in the constructions and method hereinafter disclosed, the scope of the application of which will be indicated in the claims following.

I claim:

1. A collapsible skateboard comprising:
   a platform having front and rear ends, said platform having a rear wheel mounted at said rear end;
   an upright member having upper and lower ends, said upright member having a grip portion mounted at said upper end and a front wheel mounted at said lower end;
   a bracket coupled to said upright member and extending toward said platform, said upright member being rotatable within said bracket for providing said collapsible skateboard with a steering mechanism;
   a connector mounted on said front end of said platform and pivotally coupled to said bracket;

said connector formed with a surface having a first recess at a lower end thereof and adjacent said platform, and a second recess at an upper end thereof closer to said bracket than said first recess;

an adjust pin engaging said surface of said connector, said adjust pin being slidable along said surface and insertable into said first recess for locking said upright member in a collapsed position and into said second recess for locking said upright member in an operable position, relative to said platform;

a spring attached to said skateboard and having a first end coupled to said adjust pin for providing a spring force to maintain said adjust pin in said first or second recess; and a control mechanism coupled to said adjust pin for overcoming said spring force, said control mechanism being adapted to move said adjust pin independently of said bracket and said connector to release said adjust pin from said first or second recess.

2. The collapsible skateboard of claim 1, wherein said surface of said connector is a curved surface with said lower end being spaced rearwardly of said platform relative to said upper end.

3. The collapsible skateboard of claim 2 wherein said connector is a U-shaped member having two upwardly extending lugs each having a surface formed with said first and second recesses.

4. The collapsible skateboard of claim 3 further comprising a guide member extending over each said surface such that a slot is formed in said connector between said guide member and each said surface and wherein said adjust pin is slidable within said slot between said first and second recesses.

5. The collapsible skateboard of claim 1 wherein said first end of said spring coupled to said adjust pin is an upper end of said spring, and wherein said spring has a lower end coupled to said connector at a fixed height relative to said platform.

6. A collapsible skateboard comprising:

a platform having a front end;

an upright member having upper and lower ends and extending downwardly toward said platform, said upright member having a grip portion at said upper end;

a connector mounted on said front end of said platform, said connector formed with a surface having a first recess at a lower end and a second recess at an upper end;

a pivot pin coupled to said connector and extending through at least one circular hole in said upright member for pivotally coupling said upright member to said connector;

an adjust pin engaging said surface of said connector, said adjust pin being sidable along said surface and insertable into said first and second recesses for locking said upright member in collapsed and operable positions, respectively, relative to said platform;

a spring having an upper end coupled to said adjust pin and a lower end coupled to said pivot pin for providing a spring force to maintain said adjust pin in said first or second recess; and a control mechanism coupled to said adjust pin for overcoming said spring force, said control mechanism being adapted to move said adjust pin independently of said upright member and said connector to release said adjust pin from said first or second recess.

7. The collapsible skateboard of claim 6 wherein said connector is a U-shaped member having two upwardly extending lugs each having a surface formed with said first and second recesses.

8. The collapsible skateboard of claim 6 further comprising a bracket fixedly mounted to said lower end of said upright member such that said connector is pivotally mounted to said bracket.

9. The collapsible skateboard of claim 6 wherein said surface is a curved perimeter.

10. The collapsible skateboard of claim 6 further comprising a guide member extending over said surface such that a slot is formed in said connector between said guide member and said surface and wherein said adjust pin is slidable within said slot between said first and second recesses.

11. A collapsible skateboard comprising:

a platform having front and rear ends, said platform having a rear wheel mounted at said rear end;

an upright member having upper and lower ends, said upright member having a grip portion mounted at said upper end and a front wheel mounted at said lower end;

a bracket coupled to said upright member and extending toward said platform, said upright member being rotatable within said bracket for providing said collapsible skateboard with a steering mechanism;

a connector mounted on said front end of said platform, said connector formed with a surface having a first recess at a lower end and a second recess at an upper end; said connector also including a pivot pin extending through at least one circular hole in said bracket for pivotally coupling said bracket to said connector;

an adjust pin engaging said surface of said connector, said adjust pin being slidable along said surface and insertable into said first and second recess for locking said upright member in collapsed and operable positions, respectively, relative to said platform;

a spring having a first end coupled to said adjust pin and a second end coupled to said connector for providing a spring force to maintain said adjust pin in said first or second recess; and a control mechanism coupled to said adjust pin for overcoming said spring force, said control mechanism being adapted to move said adjust pin independently of said upright member and said connector to release said adjust pin from said first or second recess.

12. The collapsible skateboard of claim 11 wherein said lower end of said spring is coupled to said pivot pin.

* * * * *